July 7, 1964
G. B. HAYES
TRANSDUCER
3,140,462
Filed June 28, 1961
3 Sheets—Sheet 1
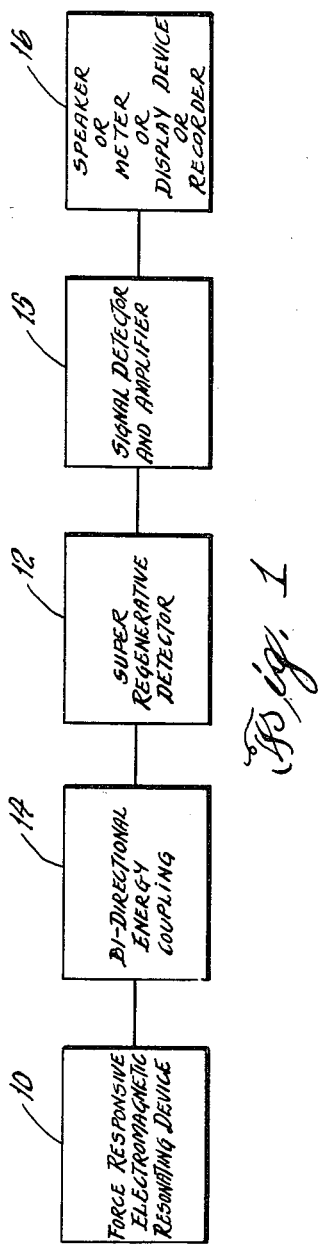
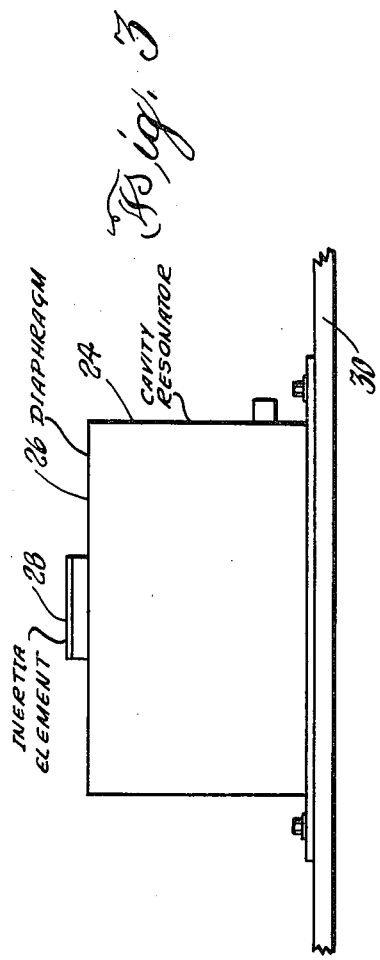
INVENTOR.
GORDON B. HAYES
BY Arthur L. Bowers
AGENT

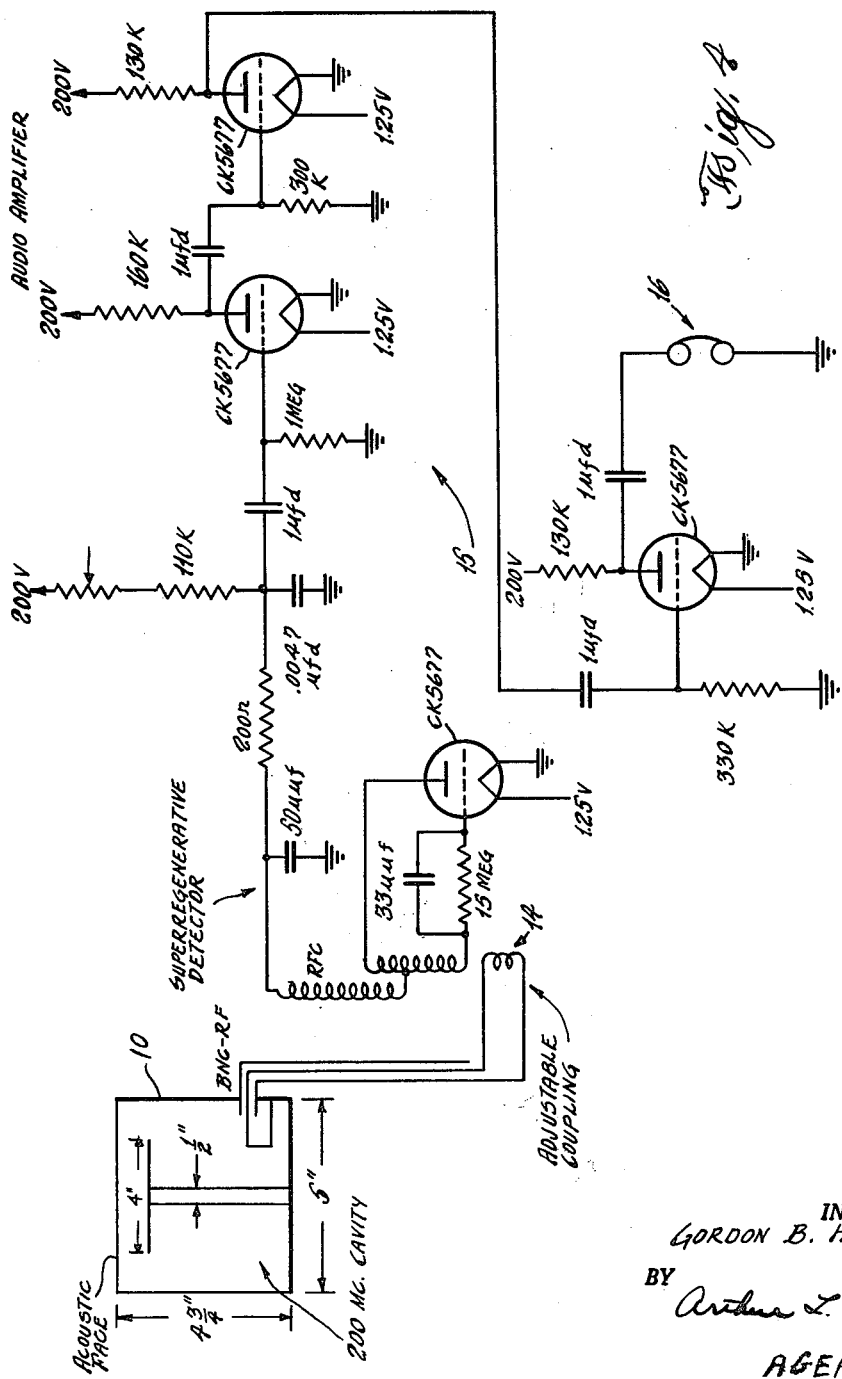

3,140,462
TRANSDUCER
Gordon B. Hayes, Sunnieside Court, R.F.D. 3,
Waterford, Conn.
Filed June 28, 1961, Ser. No. 122,055
5 Claims. (Cl. 340—13)
(Granted under Title 35, U.S. Code (1952), sec. 266)

The invention described herein may be manufactured and used by or for the Government of the United States of America for governmental purposes without the payment of any royalties thereon or therefor.

This invention relates to a novel method and apparatus for detection of low frequency waterborne sound. In a more general sense, this invention relates to detection of various kinds of force and motion among which are included airborne or waterborne acoustic energy, vibration in rigid objects, acceleration, and variation of pressure in a fluid medium.

An object of this invention is to provide a sensitive, inexpensive, simple, light-weight, easy to fabricate, and reliable device for detecting phenomena characterized by force and change in force as for example, sonic energy, fluid pressure, acceleration, fluid-borne vibration and vibration in a rigid member.

Another object is to provide a hydrophone and particularly a low frequency hydrophone for below 500 cycles/sec. that is sensitive, inexpensive, simple, light-weight, easier to fabricate and reliable.

Other objects and many of the attendant advantages of this invention will be readily appreciated as the same becomes better understood by reference to the following detailed description when considered in connection with the accompanying drawings wherein:

FIG. 1 is a block diagram illustrating the basic aspects of this invention,

FIG. 3 is a modification of the cavity shown in FIG. 2, and FIG. 4 is a diagram with design details of an embodiment of this invention.

Figure 2:
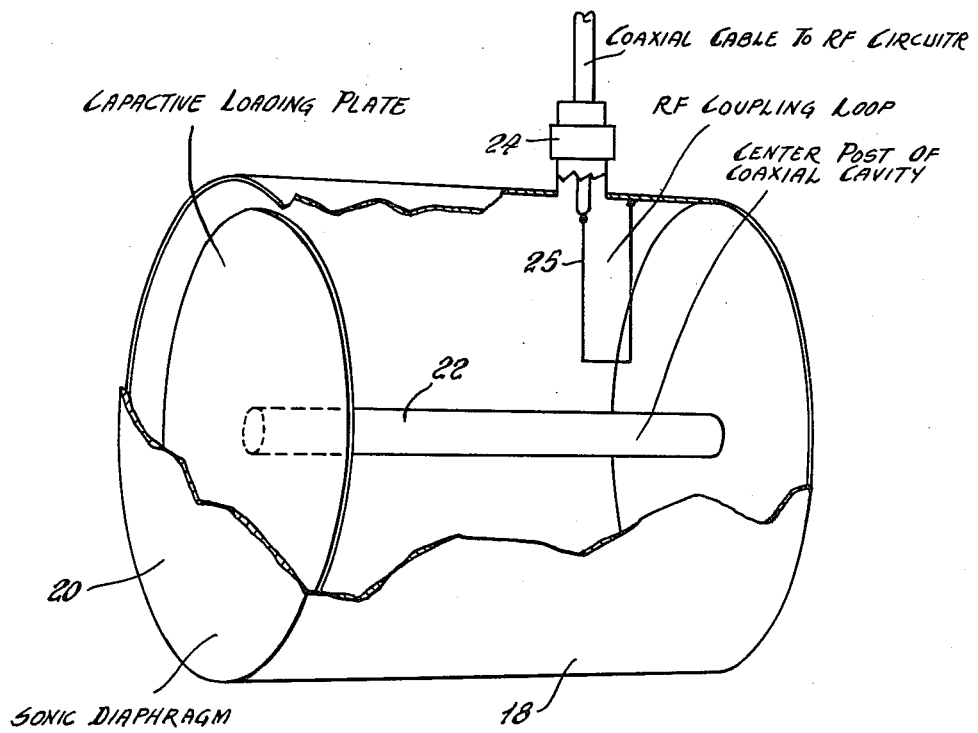
FIG. 2 is a perspective view of a resonant cavity, partly broken away for use in the combination shown in FIG. 1.

In its broader aspects, this invention concerns a combination of a super-regenerative detector and an electromagnetic resonating device both having substantially the same resonant frequency and with the resonating device coupled to the tuned input side of the detector and wherein said resonating device is responsive to change in applied force of the magnitude and character of interest to moderately shift the resonant frequency of the resonant device and its resonance characteristic as a function of the applied force.

Some examples of the resonating device contemplated in this invention are a coaxial resonant line, a length of pipe closed at both ends, a section of waveguide at resonance, a cavity resonator, and a coaxial resonate cavity with capacity between one end and the cavity center structure. The resonating device contemplated for this invention has at least a segment which has mechanical resonance or response at the sonic frequency of interest and/or which changes its configuration with respect to the remainder of the resonating device as a function of the change in force applied thereto and where the magnitude of the change in configuration is suitable for modifying the resonance and resonance characteristic within suitable limits for enabling detection. The detector alternately supplies energy to the resonating device and then obtains a fraction of that energy from the resonating device.

A super-regenerative detector is, in effect an oscillator with a tuned grid circuit, and with positive feedback from plate circuit to grid circuit; in a self quenching type of super-regenerative vacuum tube detector the grid leak bias is used and the parallel connected resistor and condenser providing the grid leak bias in series with the grid has a sufficiently long time constant to periodically interrupt the oscillations of the circuit. The rate at which the interruptions occur are termed the quench frequency and occur somewhere in the range extending between about 15,000 cycles per second and 300,000 cycles per second depending upon the frequency of oscillation in the detector. Because of the positive feedback, the circuit starts to oscillate when it is turned on. A bias voltage immediately starts to build up across the grid leak. Oscillations continue until the bias voltage becomes large enough to quench or suppress them. Following a period of rest, oscillations build up again after the grid condenser is sufficiently discharged so that the tube can amplify again. The detector is extremely sensitive immediately prior to the start of an oscillation period. The start of each oscillation period is controlled by minute random noise voltages on the order of microvolts in the tuned circuit of the detector or signal voltages of larger amplitude than the random noise voltages coupled into the detector circuit. A signal which is modulated causes the area under successive oscillation envelopes to vary with the modulation. The envelope of successive periods of oscillation initiated by random noise are substantially uniform and if rectified and the quench frequency is filtered out, the output is fairly constant. Where there is a signal input to the detector greater than the random noise, there is an increase in the area under the leading end of the envelopes of successive periods of oscillations. The center and trailing portions of the oscillation envelopes are not significantly changed by an input signal. The areas under successive oscillation envelopes vary with the amplitude signal voltage that initiates the successive periods of oscillation. One method of recovering the signal is to rectify the output and filter out the quench frequency. The amplitude of the output varies logarithmically with applied signal amplitude. The signal can also be detected as frequency modulation if the signal is frequency modulated, the center frequency being substantially the same as the resonant frequency of the detector, and the bandwidth being small enough to exert a pulling action on the oscillation in the detector. If the detector is not shielded, the radiated energy may be detected and demodulated by a frequency modulation receiver a short distance away. Phase modulation methods may be used to detect the signal.

Information on super-regenerative detectors is available in the published art as exemplified by Radio Engineering by Terman, published by McGraw Hill, 1947, pages 413–415 and pages 541–542, Radiotron Designers Handbook, reproduced and distributed by Radio Corporation of America, Harrison, N. J. 1953, page 1087, and Radio Amateurs' Handbook.

In FIG. 1 there is shown a block diagram illustrating the broader aspects of this invention. A force responsive electromagnetic resonating device 10 and the input side of a self quenching super-regenerative detector 12, are coupled by an energy transfer means 14 which permits UHF or VHF energy transfer in both directions between the resonating device and the detector. The resonating device is deformable to change its resonant frequency and response characteristic moderately in response to applied force of the type and of the magnitude of interest. The resonant frequency of the detector and the resonant frequency of the resonating device are substantially identical under selected static ambient reference conditions. Under those reference conditions, energy at frequency to which the resonating device is tuned is transferred from the detector to the resonating device during each oscillatory period of the detector. Following the oscillatory period or during the quenched period of the detector, the electromagnetic energy in the resonating device decays from its peak or input level to some lower level that is governed by the Q of the resonating device. The detector is ready for another period of oscillations before all the energy in the resonating device has decayed completely. The remaining energy being greater than the random electrical noise is seen by the detector when it is most sensitive just prior to the start of another oscillatory period of the detector and initiates the next period of oscillations. The coupling between resonating device and detector and the Q of the resonating device are factors governing the shape and area of the envelope of oscillations in the detector. When an applied force causes the resonant frequency and the resonance characteristic of the resonating device to be changed, the energy transfer between detector and resonating device is changed, i.e., the energy in the resonating device is modulated, and the area under the envelope of oscillations in the detector is changed as a function of the magnitude of the force applied to the resonating device. The energy in the resonating device is modulated by the applied force. A signal modulation detector and amplifier 15 transfers the signal to a speaker, meter, display device, or recorder 16.

In FIG. 2, there is shown a resonating device 18 for use in the combination shown in FIG. 1. The device 18 is a UHF (ultra high frequency) coaxial resonate cavity wherein an end wall 20 of the device is designed for a selected amplitude of deflection under the range and type of force of interest. The end wall 20 and the center structure 22 together comprise a variable capacity. A coaxial cable terminal 24 having an inwardly extending energy coupling loop 25 is mounted in one side of the cavity. The stiffness of the deflecting wall 20 is selected so that under the range of force anticipated the deflection has the desired effect on the resonant frequency and resonance characteristic of the detector. If the wall 20 is too stiff for the range of force of interest, the response of the detector to that range of force will be substantially negligible; if the wall is too yielding, the resonant frequency and resonance characteristic will be changed so much by excessive deflection that operation of the combination is analogous to that at saturation in a vacuum tube circuit, namely, that small variations in the large deflection will produce no change in the detector. A coaxial cable, not shown, connects the cavity 20 to coupling 14. For use in water as a hydrophone at shallow depth, the connection of the cable to the coupling is waterproofed with impregnating material, not shown. The cavity envelope requires no waterproofing.

By designing the wall 20 to be resonant to a selected band of frequency, the combination shown in FIG. 1 can be operated in a selected band. This principle is particularly advantageous when applied to very low frequency hydrophone applications. For operation at extremely low acoustic frequency, a cavity with high ratio of length to diameter, for example, a length of pipe resonant at the mechanical frequency of interest is advantageous. Neither the size nor type of cavity nor its resonant frequency is critical. Generally, where the cavity has an acoustically responsive diaphragm, the cavity frequency will be lower when the acoustically responsive diaphram is large and higher when the acoustically responsive diaphragm is small.

Information for use in designing the acoustic responsive characteristic into the resonate device can be found in Acoustical Engineering by Olson and published by D. Van Nostrand Company.

In FIG. 3 there is shown a cavity resonator 24 as in FIG. 2 with a diaphragm 26 having an inertia element 28 of dense material secured thereto; the cavity is fastened to a support 30. The diaphragm 26 will be deflected relative to the remainder of the cavity structure whenever support 30 vibrates or accelerates in either direction normal to the diaphragm 26 thereby modulating the energy in the cavity. The arrangement is suitable for use in accelerometer applications and in sensing vibrations in a rigid body.

In FIG. 4 there is shown one design for a very low frequency hydrophone in accordance with the principles of this invention and in accordance with the block diagram in FIG. 1. The hydrophone in FIG. 4 includes a superregenerative detector having a triode CK5677, paralleled 15 megohm resistor and 33 $\mu\mu$f. capacitor connected at one end to the grid of the triode and a coil connected between the plate of the triode and the other end of the paralleled resistor and capacitor. A cavity resonator 10 having one face displaceable by low frequency acoustic energy is adjustably coupled to the superregenerative detector by a coil 14. Plate voltage is applied to the superregenerative detector by a 110,000 ohm resistor, a 200 ohm resistor and a radio frequency choke RFC in series. The RFC coil blocks energy at the oscillation frequency and passes energy at the quench frequency whether modulated by low frequency energy or unmodulated. The quench frequency energy develops an output voltage across a 50 $\mu\mu$f. capacitor connected between the end of the RFC coil and ground. A .0047 $\mu$f. capacitor is connected between ground and the junction between the 180,000 ohm resistor and the 200 ohm resistor to bypass or filter out energy at the quench frequency but to block any low frequency energy. A 1 $\mu$f. capacitor and a 1 megohm resistor are series-connected across the .0047 $\mu$f. capacitor to couple low frequency energy to a two stage low frequency voltage amplifier which in turn are coupled to a low frequency power stage. An audio device, e.g. a headset is connected to the output of the power stage.

Obviously many modifications and variations of the present invention are possible in the light of the above teachings. It is therefore to be understood that within the scope of the appended claims the invention may be practiced otherwise than as specifically described.

I claim:
1. A sonic signal detector comprising an electromagnetic energy resonant cavity device having a vibratile element responsive to fluid-borne sonic signals in the lower part of the audio frequency band, said vibratile element being operable when excited into vibration to vary the resonance characteristic of said resonator as a function of the instantaneous configuration of said vibratile element relative to to said resonator, a super-regenerative detector circuit, means coupled to the output of said detector to block R.F. and filter the quench frequency from the output of said detector, electromagnetic energy coupling means for transferring energy between said cavity and the tuned portion of said super-regenerative detector, said super-regenerative detector and resonator having substantially the same resonant frequency when said vibratile element is not vibrating, whereby when said super-regenerative detector is energized and said vibratile element is not vibrating, the detected, filtered output of said super-regenerative detector is substantially constant and when said vibratile element is vibrating, the detected filtered output of said detector changes in accordance with the vibration of said vibratile element.

2. A sonic signal detector as defined in claim 1, wherein said vibratile element has a high Q and is resonant at a frequency below 500 cycles per second.

3. A sonic signal detector as defined in claim 2, wherein said vibratile element is a section of the cavity resonator envelope.

4. A low frequency hydrophone comprising a cavity resonator wherein a portion of the cavity envelope is vibratile and resonant at a frequency below 500 cycles per second and actuatable by water-borne sound pressure, and means for suppling electromagnetic energy to said resonator and for detecting the modulation of that energy by sound pressure below 500 cycles per second impinging on said vibratile element.

5. A sensing device comprising an electromagnetic energy resonator having a resilient element operable when its configuration is changed to change the resonance characteristics of said resonator as a function of the configuration of said element, a super-regenerative detector circuit, electromagnetic energy coupling means for transferring energy between said resonator and the tuned portion of said super-regenerative detector, means for blocking R.F. and filtering quench frequency from the output of said detector, whereby any force changing the configuration of said element is detected as a change in the output of said detector.

References Cited in the file of this patent

UNITED STATES PATENTS

| | | |
|---|---|---|
| 1,621,034 | Slepian | Mar. 15, 1927 |
| 2,238,117 | Koch | Apr. 15, 1941 |
| 2,331,624 | Parr | Oct. 12, 1943 |
| 2,355,088 | Lavoie | Aug. 8, 1944 |
| 2,996,611 | Stahl | Aug. 15, 1961 |